Jan. 10, 1956    H. B. CUFF ET AL    2,730,561
SUBMARINE BATTERY JAR SUPPORT CONSTRUCTION
Filed May 12, 1949    2 Sheets-Sheet 1
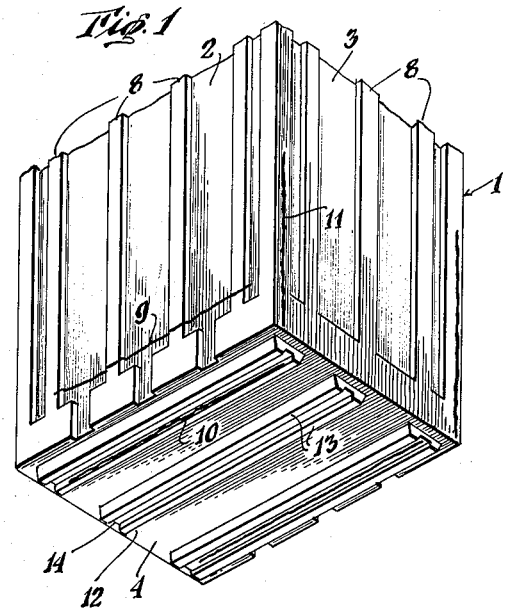
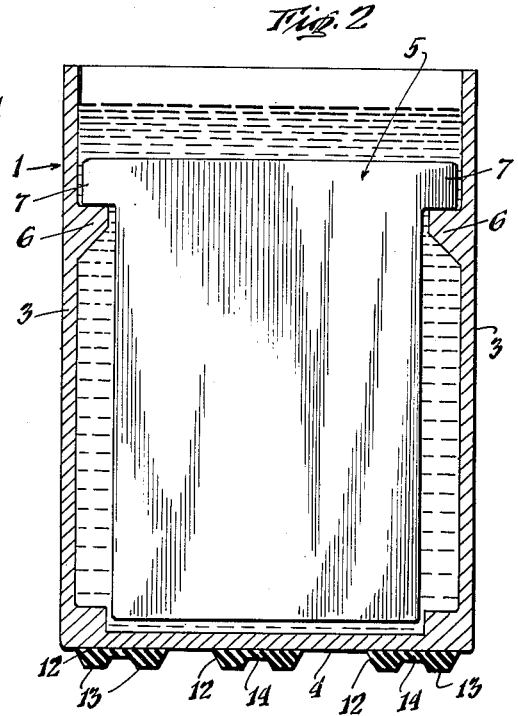
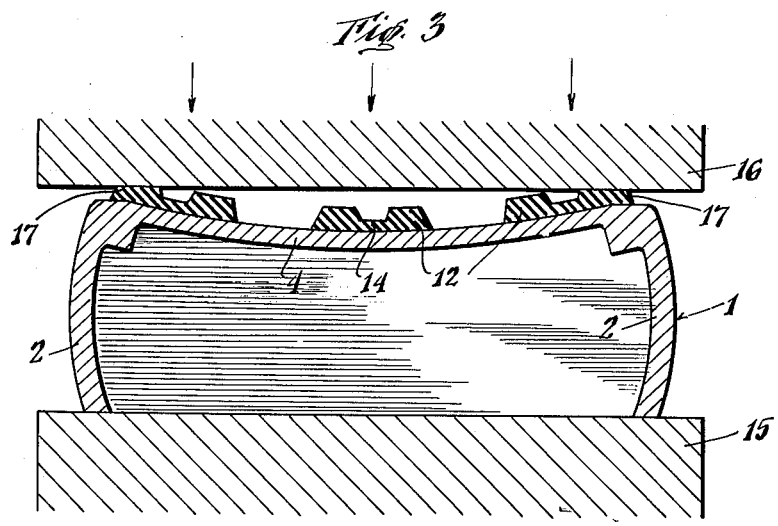
INVENTORS
HAROLD B. CUFF
HERMAN A. SWOBODA
ALBERT J. LORENZ
BY
Robert S. Dunham
ATTORNEY

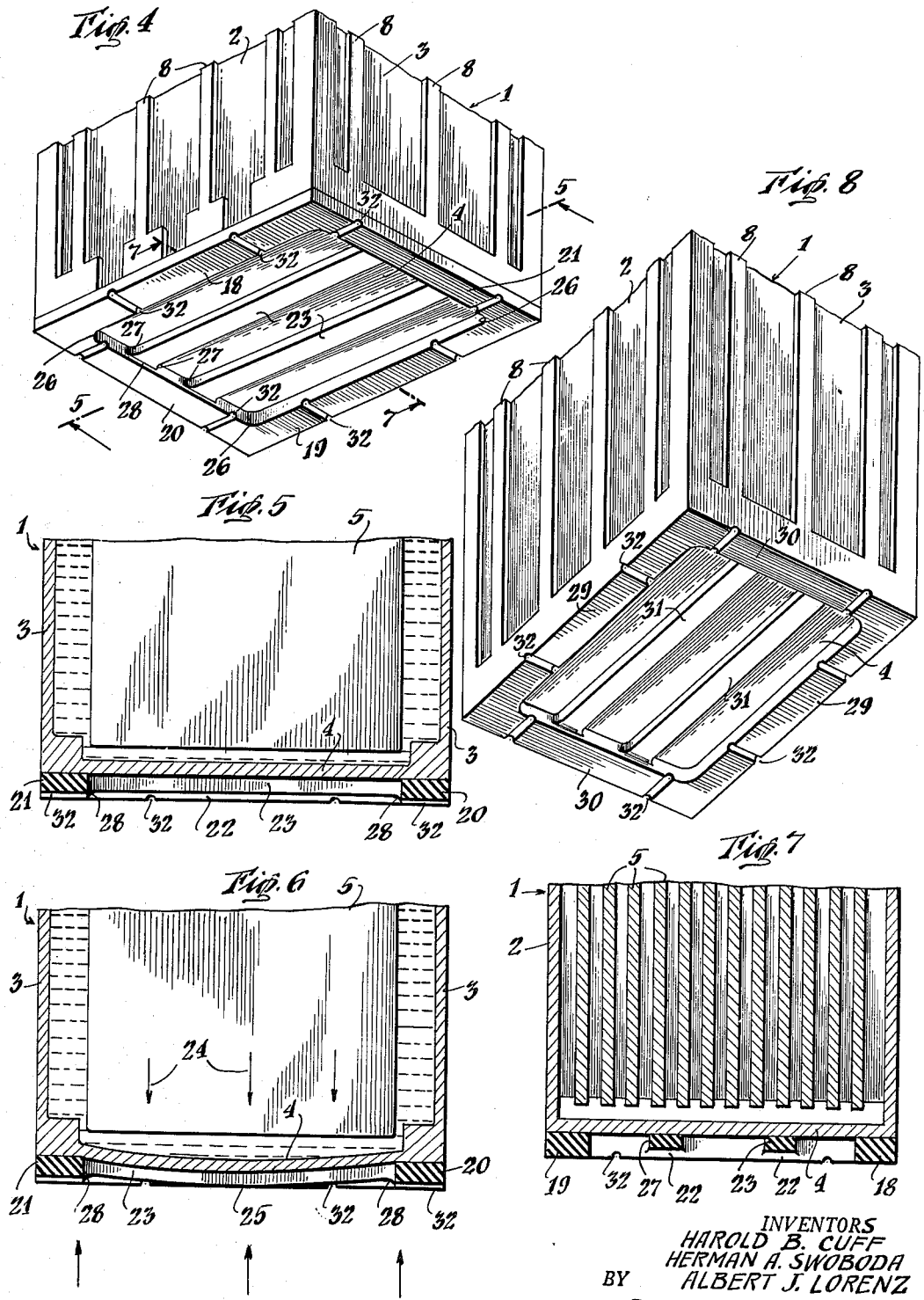

United States Patent Office 2,730,561
Patented Jan. 10, 1956

2,730,561
SUBMARINE BATTERY JAR SUPPORT CONSTRUCTION

Harold B. Cuff, Little Falls, Herman A. Swoboda, Montclair, and Albert J. Lorenz, Clifton, N. J., assignors to American Hard Rubber Company, New York, N. Y., a corporation of New York Application May 12, 1949, Serial No. 92,792

1 Claim. (Cl. 136—181)

Our present invention relates to support construction for submarine battery jars, and more particularly to such a construction as will enhance the resistance of such jars against damage due to impact shock when mounted in their normal operative position in a submarine.

Due to the restrictions imposed by the use to which they are put in submarines, involving restrictions as to both weight and dimensions, submarine battery jars are especially vulnerable to damage from impact shock, particularly such shock as is occasioned by a depth charge exploding in the vicinity of the submarine which is not sufficiently strong to effect permanent damage to the submarine hull itself, but severe enough to cause damage to the batteries by causing a failure of the battery jars. This in turn has resulted in other consequential damage of a serious nature.

The general object of our present invention is to provide a construction by which submarine battery jars, complying with the present requirements as to size and weight, may be suitably supported, so as to have a maximum resistance to damage from impact shock of this kind, and wherein the limiting factor in strength is not the bottom portion of the jar, as has been the case heretofore, but rather the resistance of the wall structure of the jar itself, the support construction being suitably improved to eliminate this bottom portion as the weak link of the chain.

The principles involved will be set out more in detail hereinafter as will the weaknesses in present commercial constructions and the manner in which the present invention provides for the improvement thereof.

The present invention may be summarized as follows. It is limited to support constructions for storage batteries of the type used in submarines, i. e. where the design of the battery is required to conform to certain weight and space limitations; wherein the battery is intended to rest in use upon a supporting surface such as that of a battery compartment in a submarine; and wherein the battery includes a jar having a bottom and substantially vertical side walls and includes an electrode structure of known character which is suspended from the upper parts of the side walls, so that the side walls carry substantially the entire weight of the electrode structure. The present invention provides a supporting means or structure for a battery jar as aforesaid, which may be formed integral with the jar or separate therefrom; and if separate, may be formed in one or more pieces, such as a frame made up either as a single unit or made up of several separable pieces. The frame or supporting structure as aforesaid comprises a supporting portion, such as a flat bar, disposed in substantial vertical alignment with each of the side walls of the battery jar below the bottom thereof, the frame or supporting structure being of substantially the same outline as the horizontal area and shape of the bottom. The bars or supporting portions of the frame must extend vertically downwardly from the battery jar proper a distance, further than any means which may be provided to support the center portion of the jar bottom inwardly of the supported edge portions thereof which are in substantial alignment with the vertical walls. Thus when the battery thus supported is subjected to upward shock, the downward movement of the center part of the bottom is permitted to a certain extent, but is limited to an amount which will be within the elastic limit of the material of which the bottom of the battery jar is composed, usually hard rubber. The supporting portions, which are disposed beneath the side walls, are composed, to a distance downwardly from the bottom proper of the jar as aforesaid, of material having at least about as high a resistance to compression as the side walls themselves, so as to insure that the bottom portions of the jar will not be the weakest point or element of the battery in the event of an impact shock. Specifically the supporting means should be of material, or coated with material, which will be resistant to battery acid, so that in the event that some of this acid should spill and come into contact with the supporting means, no chemical corrosion will occur.

More particularly, in the preferred construction, the invention includes the provision of supporting members, particularly ribs, extended across the bottom and preferably parallel to the side walls of the supporting portions previously described, these ribs preferably being integral or rigid with the supporting frame as above outlined and preferably having their upper surfaces in direct and preferably continuous contact with the jar bottom. The ribs are, however, less in thickness than the supporting portions which underlie the vertical walls of the battery by an amount approximating about one-eighth inch, so as to permit, and yet limit, the downward movement of the center part of a battery jar bottom incident to an impact shock as aforesaid. Specifically, the supporting portions and ribs are preferably formed of a hard rubber composition and formed as an integral structure, either as a separate frame for a flat bottomed battery jar, or integral with the jar itself, the principles of our invention applying to these two types of construction.

Other and more detailed objects of the present invention will become apparent from the following detailed description of a preferred embodiment thereof, when taken in connection with the accompanying drawings, in which:

Figure 1 is a fragmentary view in perspective of the bottom and side portions of a battery jar showing the present commercial construction and indicating how failures have occurred with the present construction;

Fig. 2 is a view in transverse vertical section illustrating a battery jar constructed in accordance with present commercial practices, and illustrating also the manner in which the electrode structure is supported by the side walls;

Fig. 3 is a fragmentary view, illustrating a test performed on a section cut from a battery jar and its supports as shown in Figs. 1 and 2, illustrating the effect of compressive strains to which this section has been subjected in the test, resulting in failure of the type experienced in practice;

Fig. 4 is a fragmentary bottom perspective view similar to Fig. 1, showing a portion of a battery jar with which a support according to our invention is associated;

Fig. 5 is a fragmentary view taken substantially on the line 5—5 of Fig. 4 and illustrating in vertical section a portion of a conventional battery jar with which is associated a separate support in accordance with the present invention;

Fig. 6 is a view similar to Fig. 5, showing the effect of impact shock upon the parts of the battery jar and the support therefor;

Fig. 7 is a view in transverse vertical section taken substantially on the line 7—7 of Fig. 4 further illustrating the construction of the battery jar and its support; and Fig. 8 is a fragmentary view, substantially in bottom perspective, illustrating a support in accordance with the present invention formed integral with a battery jar.

In order to appreciate the improvements effected by the present invention, it will be necessary to consider, for purposes of comparison, the present commercial construction and the problems which must be met in apparatus of this kind.

Batteries for use in submarines are limited as to their outside dimensions and also inside dimensions and further are limited as to weight. If it were possible, for example, to make the walls of a submarine battery jar as heavy in proportion to their size and capacity as those of the average automobile storage battery, no real problem would exist, as the walls would be sufficiently strong to resist any shocks which were not so severe as to effect serious damage to the electrode structure itself. With submarine batteries, however, the battery jars themselves are quite large in size. In addition to this, the walls must be relatively thin in proportion to the size and capacity of the jars. The internal volumetric capacity must be a maximum, permitting maximum size electrodes to be used, which can be fitted into the space and permitting a desired volume of liquid electrolyte, usually a dilute sulfuric acid solution, to be used therewith. These batteries are normally carried in special battery compartments provided in submarines, which compartments may be lined with soft rubber, this layer or lining being essentially compressible in character. It is necessary, therefore, that any batteries or battery support construction usable in this field shall lend itself to use in the type of compartment which is now being provided in submarines in accordance with approved practice.

There is shown in Figs. 1 and 2 a battery jar generally indicated at 1 having side walls 2 and 3 and a bottom wall 4. Within the jar 1 is an electrode structure generally indicated at 5, which may be of any desired or known construction. This electrode structure is immersed in an aqueous solution usually of sulfuric acid in accordance with present commercial practices. The electrode structure 5 is normally supported from the upper portion of the side walls 2 by ledges 6, upon which the electrode structure 5 is suspended by means of extended portions 7. Thus the entire weight of the electrode structure 5, which is a large part of the weight of the battery as a whole, is carried by the side walls 3 of the battery as shown.

It will further be noted, by reference to Fig. 1, that the side walls 2 and 3 have thickened rib portions 8, the space between these thickened rib portions being cut away. In calculating the thickness of the side walls for purposes of the present application, this thickness may be assumed to be the thickness of the wall at one of the ribs 8, so as to include not only the thickness intermediate the ribs, but also the rib thickness. It is contemplated that a battery jar formed as just described will be used without substantial change in combination with the support construction of the present invention. Thus the present invention is intended for association with a known type battery jar.

It has been found in practice that the failure of battery jars when subject to impact shock has resulted in a cracking of the side wall or bottom wall, or both, usually adjacent to one or more of the lower corners or junctures of the side and bottom walls, for example as shown by the line 9 in the side wall, Fig. 1, or by the line 10 in the bottom wall thereof. In some instances there have been substantially vertical cracks as shown at 11, Fig. 1, adjacent to one of the corners where one side wall meets another.

This same type of failure has been caused artificially by subjecting standard battery jars as described above to a type of impact testing which is carried on by or under the control of the U. S. Navy. This particular test is, therefore, considered standard by the Navy and characteristic of the type of action resulting from the sudden application of force encountered by the battery in use when a submarine in which the battery is used is subjected to shock from a depth bomb reasonably close thereto, but yet not so close as to destroy the submarine itself by damage to the hull.

The type of support construction now being used for supporting battery jars is shown in Figs. 1 and 2 and includes a plurality of duplex soft rubber strips 12, each including a pair of support members or bars 13 connected by a thinner web section 14. These strips 12 are in practice formed of a relatively soft rubber composition as contrasted with the relatively hard rubber composition of which the jar 1 is itself made. The strips 12 are positioned in practice substantially as shown in Figs. 1 and 2.

In seeking to provide a better construction than that hereinabove described in connection with Figs. 1 and 2, applicants had to devise a test, which was characteristic in its results of the test used by the U. S. Navy, so as to give at least qualitatively the same type results, i. e. the same type failures illustrated in Fig. 1 at 9, 10 and 11, and to be quantitatively characteristic of the Navy tests, even though the numerical results may be somewhat different. It was found that when a section of a battery jar substantially six inches high and including the bottom portion thereof was placed in inverted position as shown in Fig. 3 upon the platen of a hydraulic press and pressure gradually applied to the jar bottom from above as shown in Fig. 3, the desired type results were obtained. In this figure there is diagrammatically illustrated at 15 the platen of such a press, which is held stationary. The movable member or plunger of such a press, shown at 16, was capable of exerting a variable and ascertainable pressure upon a section of the battery jar.

This test was therefore decided upon as being characteristic of the type of force application to be guarded against. It is recognized that the application of force by a hydraulic press in a gradual manner is not the same as the impact shock which must be guarded against in use; and further that the application of force expressed as a numerical value in total tons pressure is essentially different from the actual and possibly equivalent force of an impact shock which may produce the same result. It has been found, however, that the test herein used resulted in the same types of failures shown in Fig. 1 at 9, 10 and 11 at some value and that when a supporting construction in accordance with the present invention was tested as aforesaid, that the resistance of the improved construction was demonstrated by requiring much higher force to produce failure, and further the failure, when it did occur, was of an essentially different character from that illustrated at 9, 10 and 11, Fig. 1. It is believed, therefore, that this test is appropriate to demonstrate the superior characteristics of the construction of the present invention; and that actual tests in use will give essentially similar results.

Fig. 3 demonstrates the type of deformation produced in a section of a jar bottom provided with the support construction currently in use when subjected to a pressure test in a hydraulic press as above described. As shown in this figure the two outer rubber soft feet or bars indicated at 17 carried substantially all the load. The feet or bars 17 were located eccentric of the walls 2 and those walls bulged outwardly. At the same time, the center portion of the bottom 4 bulged downwardly as shown.

When a complete jar bottom was tested as shown in Fig. 3, the initial failure which occurred was substantially as shown by the lines 9 and 10, Fig. 1, this failure taking place at about 10 to 12 tons total pressure, and final failure at about 19 to 20 tons total pressure. These tests were repeated several times; and in each case the character of the failure and the numerical value of pressure causing such failure were substantially identical. Initial failure was characterized by an audible cracking noise in each case. It is believed that this failure occurred to a major extent due to one or more couples set up by the eccentric disposition of the feet 17 in respect to the side walls. It is believed further that the fact that the weight load was not substantially uniformly distributed under the side walls by a support construction of sufficient area contributed to the failure.

Subsequent research in which many different trials were made, using various materials of different shape, size, etc., has resulted in the production of the support construction according to the present invention. These constructions are shown in Figs. 4 to 8 inclusive.

Referring now to Figs. 4 to 7 inclusive, there is illustrated a battery jar 1, which may be of the same form as that shown in Figs. 1 and 2, and hereinabove described, with the exception that it does not include the soft rubber strips 12 shown in Figs. 1 and 2, but instead has associated therewith a separate support construction in accordance with the present invention. For this reason the battery jar 1 and those parts 2, 3, 4, 5 and 8 are given the same reference characters used in conjunction with the description of Figs. 1 and 2. In practice the same jar construction may be and is contemplated to be used, but without the strips 12, which have been separately formed and thereafter cemented to the bottom 4 in accordance with prior art practices. These strips are eliminated in accordance with the present invention. It will be understood that the battery jar 1 is in practice made of a hard rubber composition, the details of which form no part of the present invention.

The supporting means of the present invention comprises supporting portions disposed beneath and in substantial alignment with each of the side walls 2 and 3 of the battery jar, such supporting portions being shown as bars 18 and 19 supporting the walls 2, and 20 and 21 supporting the walls 3. While the bars or portions 18 to 21 are here shown as parts of an integral frame which are rigid with one another at the corners and may in addition be integral and of a substantially uniform composition, it will be understood that our invention broadly considered, contemplates that these portions may be separate, and most if not all the advantageous results of the present invention attained by such a construction. The supporting portions 18 through 21 inclusive are, as aforesaid, located immediately under and in substantial alignment with the side walls 2 and 3. Thus pressure exerted upon the side walls by the test aforesaid involving the use of a hydraulic press or by the application of force incident to a sudden shock will effect a direct compression as between the side walls and the supporting portions 18 to 21. There will be no turning moments as illustrated in Fig. 3 for example, and no shearing stresses upon the walls or bottom of the battery jar itself. This has been demonstrated to be a fact by the character of the failure when using a support of this kind, which was a typical crushing failure, rather than a bending or shearing failure. The failure in tests of devices according to the present invention occurred in all cases at values substantially above those given for the device shown in Figs. 1 and 2.

It was found further that the supporting portions 18 to 21 should have a horizontal width at least about as great as the thickness of the side walls, and preferably from about 1 to 1½ times such thickness. For example, with a side wall thickness (including the thickness of the ribs 8) of one inch, a horizontal width for the members 18 to 21 of about 1½" was found to give highly advantageous results, as this distributes the pressure more uniformly over the battery jar. For example, initial failures under pressures of the order of magnitude of 50 tons total pressure using the same compression test with a hydraulic press as illustrated in Fig. 3 were recorded in practice tests with support structures in accordance with the present invention.

The material of the supporting means in accordance with the present invention is not critical as to the chemical composition generally, except as specifically hereinafter noted, but it must have, for best results, a resistance to compression at least about as high as that of the side walls of the battery jar itself, so as not to form a weak link in the chain by failing prior to the time the side walls of the battery will fail. For this purpose, therefore, relatively hard woods have been tried as have also strips of steel, as well as hard rubber compositions of the same or similar nature to the material of which the battery jar itself is formed. In the use of different kinds of materials, however, attention must be paid to the possibility of battery electrolyte coming into contact with the supporting structure, so that if any material, such as steel, which may be corroded by electrolyte, be used, this material must be protected by an outer coating of some material which is resistant to chemical corrosion by such electrolyte, such as a thin layer of rubber or the like. With this single limitation, chemical composition need not enter into consideration.

The question arose during the several tests whether a support of uniform thickness underlying the entire bottom surface of the battery jar would be adequate to secure the desired results. This has been found not to be the case, and a perimetrical type of support as disclosed in Figs. 4 to 8 inclusive has been found to be essential in order to obtain wholly satisfactory results. The reason for this seems to be that when a battery jar and its support are positioned, as submarine battery jars often are in use, upon a compressible underlying support or surface, such as the soft rubber lining in the battery compartment of a submarine, and when such an assembly is subjected to sudden compressive stresses or even to slow compressive stresses, the force effective in alignment with the side walls incident to the support by the side walls of the electrode structure of the battery is much greater than the force imposed by the electrolyte effective on the center portion of the bottom wall 4 of the jar. As a result there is a greater compression of the underlying compressible support at zones in alignment with the side walls than in the center. If then the center were not relieved, by either an opening or recess as provided, for example, in the Fig. 4 form of the invention and as shown particularly in Fig. 5, the compressible material of the underlying support would tend to force the center portion of the battery jar upwardly and could result in a rupture of this part of the bottom. The same results as to distribution of forces may be reached, even if the underlying support is essentially incompressible in character, as a steel plate. This is due to the compressible character of the material of which supports such as 18 to 21 would normally be made, for example, hard rubber. By providing the principal relatively rigid support in a perimetrical manner as indicated in Figs. 4 to 7, so that each of the supporting portions 18 to 21 extends a substantial distance vertically downwardly further than any relatively rigid structure, which could support the bottom of the jar inwardly of said supporting portions, this undesired rupture of the center portion of the jar bottom is eliminated. The amount of such relief, i. e. as between the downward extent or vertical thickness of the portions 18 to 21 and the thickness of any means for supporting the center part of the bottom, will of course depend essentially upon the thickness, compressibility and amount of compressible material at the bottom of the battery compartment in which the jar and its support in accordance with the present invention is put. In practice this distance, indicated in Fig. 5 at 22, has been found to be in the order of magnitude of at least about ⅛". This is so whether the center portion of the bottom 4 be supported by rib or other supporting means as hereinafter described or not. In practice, it is usually desired that the supporting portions 18 to 21 be from about ½ inch to about ¾ inch in thickness, with the thickness of the intermediate supporting means hereinafter described which support the center part of the jar bottom approximately ⅛ inch less.

There is preferably provided, in accordance with the present invention some intermediate supporting means, such as one or more ribs as shown at 23. These ribs as shown are parallel to the supporting portions 18 and 19 and extend the entire distance between the supporting portions 20 and 21. In their normal position as shown in Figs. 4 and 5, the upper surfaces of the ribs 23 are in direct contact with the flat bottom 4 of the battery jar. The ribs 23 are, however, thinner in their vertical thickness than are the supporting portions 18 to 21, so that their lower surfaces are normally in a plane parallel to the lower surfaces of the supporting portions 18 to 21 but above such plane by the thickness of the space 22, which as stated above is of the order of magnitude of about ⅛ inch. The material of the ribs 23 may be the same as that of the supporting portions 18 through 21. The width of the ribs 23 may be any desired amount, preferably approximately the same as that of the supporting portions 18 through 21, although this is not critical.

In practice the ribs 23 serve as a partial support for the center portion of the bottom 4, permitting, however, a downward bulging of the bottom 4 as shown in Fig. 6 in the event of a vertical shock or shock effective to give a vertical component of force effective on the support for the battery. In the event of an upward thrust of force on the battery support the inertia of the liquid electrolyte in the battery will be effective to act upon the bottom as indicated by the arrows 24, Fig. 6. This will cause a flexing of the bottom 4 of the battery jar, which, however, will be restricted to the elastic limit of the material of the battery jar or less by reason of the engagement of the center part of the ribs 23 with the supporting surface as indicated at 25. At the same time, in the event of such a shock, as the compressible material forming the lining of the battery compartment is relatively less compressed in the area bounded by the supporting portions 18 to 21 than that beneath such portions, space is provided for accommodating this compressible material without unduly bulging the bottom 4 of the jar upwardly, so as to cause a possible failure thereof.

The frame formed of the supporting portions 18 through 21 and 23 in practice preferably includes fillets at the several otherwise square corners as indicated at 26, 27 and 28. This construction provides for distribution of forces in a better manner than is possible with square cornered parts, at least at the meeting of surfaces at inside corners.

While the construction of Figs. 4 to 7 has been described and is intended for use as a separate frame, it is contemplated that substantially the same desirable results can be obtained by providing, integral with the battery jar, a bottom shape equivalent to that formed by a combination of the present battery construction with the frame including parts 18 to 21 and 23. Such an integral construction is shown in Fig. 8, wherein the sides 2 and 3 are extended downwardly to form integral downwardly extending flanges as shown at 29 and 30, corresponding functionally and structurally to the supporting portions 18 to 21 inclusive. There may further be provided ribs as shown at 31, corresponding to the ribs 23, these also being molded integrally with the remainder of the battery jar and from the same material. The form, shape and size of the parts in this figure may be the same as that previously described for the Figs. 4 to 7 form of the invention.

If desired there may be placed beneath the supporting members 18 through 21 on the downwardly extending flanges 29 and 30, soft rubber pads (not shown) to give some added resiliency in normal operation, even though it may be that the soft rubber might be damaged or destroyed by a strong impact shock. If used, such soft rubber pads would extend in addition to the dimensions hereinabove given as to the thickness of the supporting means.

If desired there may be provided in the underside of the supporting portions 18 through 21 and/or 29 and 30 small semi-cylindrical grooves 32, sufficient in number and size to permit a flow of battery electrolyte or other liquid between the inside portion beneath the center part of the bottom part of the battery jar and the outside. This permits the flow of any battery electrolyte or other liquid present between the inside and the outside of the battery support, which is useful in the event that some liquid should flow or be spilled into the battery compartment.

It has been found on actual tests with supporting constructions in accordance with the present invention that it required a pressure of approximately 50 tons total pressure to cause initial failure and about 65 tons total pressure to effect final failure of the battery jar thus supported. These figures approximate the figures for the initial and final failures for the sides of the battery itself, thus eliminating the battery bottom portion as a weak link in the chain.

While we have shown and described but two principal forms of our invention, and have suggested some variations thereof, other equivalent constructions will be suggested by the description above to those skilled in the art. We do not wish to be limited, therefore, except by the scope of the appended claim, which is to be construed validly as broadly as the state of the prior art permits.

What is claimed is:

Supporting means for the jar of a storage battery of the type used in submarines, wherein the battery and its supporting means is adapted to rest upon a supporting surface, wherein said jar has a bottom and substantially vertical side walls, which are adapted to support an electrode structure suspended from the upper parts of said side walls, and wherein the supporting means for the battery jar is adapted for enhancing its resistance to impact shocks, said supporting means comprising supporting portions disposed beneath and in substantial vertical alignment with each of said side walls about the periphery of the bottom of the jar, a plurality of spaced supporting members for supporting a part of the bottom of said battery jar inwardly of the side walls thereof, each of said supporting portions extending a substantial distance vertically downwardly further than any of said supporting members, and each of said supporting portions and said supporting members being composed of material having at least about as high a resistance to compression as the material of which the side walls of said jar are composed, whereby to avoid failure of said battery jar due to torsional and shearing stresses effective on the battery jar adjacent to the junctures of the bottom and side walls, wherein said supporting portions are formed as the sides of a rectangular rigid frame having an outside contour substantially the same as that of the bottom of the battery jar, wherein said supporting members are a plurality of parallel ribs, wherein said ribs and said supporting members are all composed of a hard rubber composition and are formed integral with one another, the lower surfaces of said ribs lying in a horizontal plane above and parallel with the plane of the lower surfaces of said supporting portions and the distance between these two planes in a vertical direction being at least about ⅛ inch, whereby relative movement between the center portion of the bottom of the jar and the edge portions thereof in vertical alignment with the side walls is limited substantially to the difference between the thickness of said supporting portions and said ribs, and is maintained within the elastic limit of the material forming the bottom of the battery jar.

References Cited in the file of this patent

UNITED STATES PATENTS

| | | |
|---|---|---|
| 672,219 | Stevens | Apr. 16, 1901 |
| 1,256,750 | Weida | Feb. 19, 1918 |
| 1,272,247 | Ford | July 9, 1918 |
| 1,425,574 | Boyer | Aug. 15, 1922 |
| 2,427,639 | Weida | Sept. 16, 1947 |